Nov. 15, 1955  J. T. RUTHERFORD  2,723,995
PROCESS FOR RECOVERING BENZOIC AND TOLUIC ACIDS
Filed Feb. 19, 1954
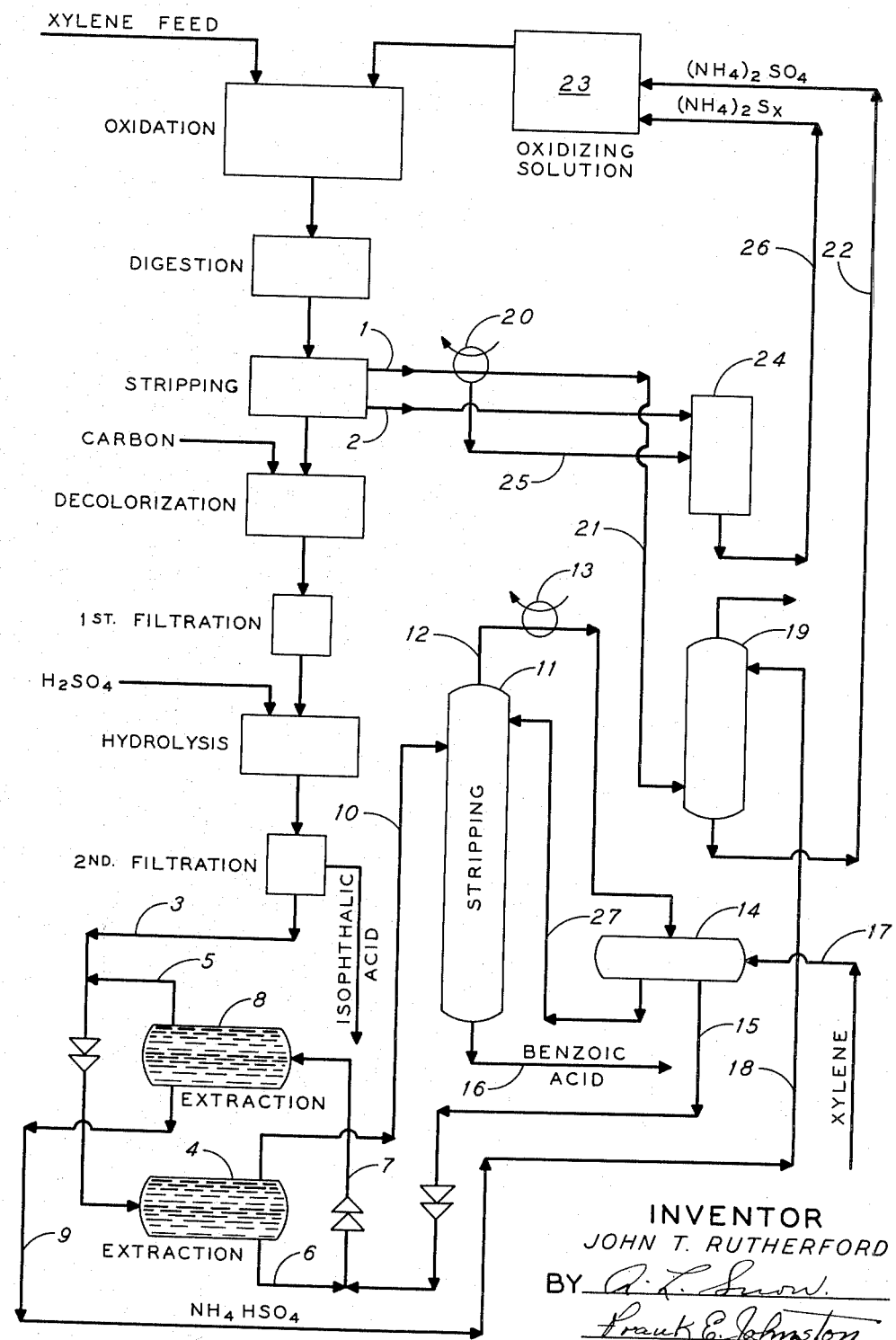
INVENTOR
JOHN T. RUTHERFORD
BY
ATTORNEYS UnitedStatesPatentOffice 2,723,995
Patented Nov. 15, 1955

2,723,995

PROCESS FOR RECOVERING BENZOIC AND TOLUIC ACIDS

John T. Rutherford, Berkeley, Calif., assignor to California Research Corporation, San Francisco, Calif., a corporation of Delaware Application February 19, 1954, Serial No. 411,323

5 Claims. (Cl. 260—524)

This invention relates to a process for recovering benzoic acid from dilute aqueous solutions thereof. More particularly, the invention relates to a process for recovering benzoic acid from dilute aqueous solutions of mixtures of benzoic acid, toluic acid and isophthalic acid.

U. S. Patent No. 2,610,980 describes a process for oxidizing alkyl benzenes to produce amides of aromatic carboxylic acids. The acids themselves can be recovered from the amide reaction product by hydrolyzing the amide with an acid catalyst and separating the acid from the hydrolysis reaction product. When the process described in this patent is employed to produce isophthalic acid or terephthalic acid by oxidizing meta-xylene or para-xylene, the crude reaction product contains not only the amides of the phthalic acids, but also benzamide and amides of toluic acids. When this crude reaction product is hydrolyzed by heating it with water and a strong acid such as sulfuric acid or hydrochloric acid, and the hydrolysis mixture is cooled, the phthalic acids are precipitated. The cooled hydrolysis reaction product is then filtered to recover phthalic acids as a filter cake and a filtrate is produced which contains minor amounts of benzoic acid, toluic acid and phthalic acid, each of the acids being present at concentrations ordinarily in the range from about 0.1 to 3% by weight. When the oxidation reaction has been conducted pursuant to recently improved methods, large volumes of this filtrate are produced and commercially significant quantities of benzoic acid are present at low concentration. The benzoic acid content of the filtrate is too great to permit it to be disposed of in the usual manner as an industrial waste and, further, the benzoic acid can be recovered as a valuable by-product.

In addition to the organic acids, the filtrate has a substantial content of ammonium sulfate, ammonium bisulfate, or ammonium chloride and may contain, in addition, an appreciable quantity of the acid employed as the hydrolysis catalyst.

In its broad aspect the present invention comprises a process for treating aqueous solutions containing from about 0.1 to about 3% by weight of benzoic acid by dissolving from about 5% to about 35% by weight of at least one material of the group consisting of sulfuric acid, ammonium sulfate and ammonium bisulfate in the solution, extracting the resulting solution with xylene at a temperature below about 250° F., separating a xylene phase and an aqueous phase and recovering benzoic acid from the xylene phase.

The process of the invention is particularly well adapted for use in conjunction with a recently developed process for oxidizing xylenes to produce phthalic acids. Pursuant to this process, a xylene is contacted with ammonium sulfate, at least one sulfide of the group consisting of hydrogen sulfide, ammonium sulfide and ammonium polysulfide, and water in a reaction zone at a temperature from about 550° F. to the critical temperature of water under superatmospheric pressure sufficient to maintain a part of the water in liquid phase, acidifying the reaction product and filtering it to recover a filter cake comprising phthalic acid values, hydrolyzing the filter cake by heating it with aqueous sulfuric acid and filtering the hydrolyzate to separate phthalic acids and a filtrate comprising aqueous ammonium sulfate containing small amounts of benzoic acid, toluic acid and phthalic acid. The filtrate thus recovered is then extracted at least once at about 150° F. to 250° F. with 0.01 to 0.5 volume of xylene per volume of solution. A xylene phase and an aqueous phase are then separated and benzoic acid and toluic acid are recovered from the xylene phase. This application of the process of the invention will be better understood by reference to the appended drawing which is a diagrammatic illustration of apparatus and process flow suitable for use in recovering benzoic acid.

A xylene feed, usually meta-xylene or para-xylene, and an aqueous oxidizing solution containing from about 1.5 to about 1.75 moles of ammonium sulfate per mole of xylene charged, and from about 0.05 to 0.3 mole of ammonium polysulfide per mole of xylene charged are passed into an oxidation zone maintained at a temperature from about 550° F. to 750° F. The residence time of this mixture in the oxidation zone is of the order of 30 minutes. The oxidation reaction product is passed from the oxidation zone to a digestion zone where it is digested for a period of from 5 to 10 minutes at a temperature of about 500° F. and at a pressure of about 1000 p. s. i. g. The digested reaction mixture passes into a stripping zone from which ammonia and hydrogen sulfide are removed overhead through line 1 and from which molten sulfur is removed through line 2. The stripped aqueous product is then passed into a decolorization zone where it is contacted with activated carbon and then to a filtering zone where it is filtered at about 200° F. to remove the carbon as a filter cake. The filtrate is then passed into a hydrolysis zone where it is heated to about 500° F. with sulfuric acid to produce a hydrolysis product which is a slurry of phthalic acid in aqueous ammonium bisulfate. The aqueous ammonium bisulfate may contain a small amount of either sulfuric acid or ammonium sulfate depending upon the amount of acid catalyst used in the hydrolysis step. The hydrolysis product is passed into a filtering zone where solid phthalic acid is recovered as a product. The filtrate is then passed through line 3 into settling drum 4. Xylene is passed into line 3 from line 5. Line mixers in line 3 downstream from the junction of lines 3 and 5 provide intimate contact of the filtrate and the xylene. In settler 4 an aqueous phase and a xylene phase are separated. The aqueous phase is withdrawn through line 6 and is passed into line 7, flowing through line 7 to settling zone 8. Line mixers in line 7 provide intimate contact between the aqueous and xylene phases. Two phases are separated in settler 8, an upper xylene phase which is withdrawn through line 5, and a lower aqueous phase which is withdrawn through line 9. The upper xylene phase separated in settler 4 is withdrawn through line 10 and passed into distillation zone 11 where xylene is removed overhead through line 12, condensed in condenser 13, and passed into drum 14. A portion of the xylene may be returned from drum 14 through line 27 as reflux. Xylene is withdrawn from drum 14 through line 15 and returned to settling zone 8. Benzoic and toluic acids are withdrawn from distillation zone 11 through line 16 as a bottoms product. Fresh xylene is introduced into the system through line 17 as required. Ammonium bisulfate substantially free of benzoic and toluic acid is passed through lines 9 and 18 into contactor 19. Uncondensed gas comprising ammonia leaving condenser 20 is passed through line 21 into contactor 19 where ammonia is absorbed by ammonium bisulfate. Ammonium sulfate is withdrawn from contactor 19 and passed through line 22 into storage tank 23. Liquid sulfur recovered at the stripping zone is passed through line 2 into sulfur dissolving zone 24.

Aqueous ammonium sulfide condensed in condenser 20 is passed through line 25 into sulfur dissolver 24. Ammonium polysulfide is withdrawn from sulfur dissolver 24 and passed through line 26 into storage tank 23.

By operating in the manner described and illustrated in the drawing, by-product benzoic acid is effectively recovered from the filtrate produced at the second filtration step. Settlers 4 and 8 are operated at about 200° F. so that phthalic acids contained in the filtrate remain in solution and are returned with the extracted filtrate to the oxidation zone. Xylene is employed as the solvent to extract benzoic acid from the filtrate, and xylene dissolved or entrained in the aqueous phase leaving settler 8 through line 9 ultimately passes into the oxidation zone and is there converted to phthalic acid so that no net loss of the solvent is sustained.

In operation conforming substantially to that described in connection with the drawing, 6000 parts by weight per hour of filtrate are passed through line 3 into settler 4. This filtrate contains 14.4% by weight of ammonium sulfate, 10.5% by weight of sulfuric acid (these two materials are present for the most part as ammonium bisulfate), .2% by weight of isophthalic acid, 1.7% by weight of ortho-phthalic acid, 1.3% by weight of benzoic acid and 0.3% by weight of meta-toluic acid. 400 parts by weight of xylene, preferably rich in meta-xylene, are passed through line 7 into settler 8 each hour. Upward of 90% of the benzoic and toluic acid contained in the filtrate are recovered through line 16.

The process of the invention is well adapted to recovery of benzoic acid from dilute aqueous solutions of benzoic acid alone. For example, aqueous benzoic acid containing benzoic acid at a concentration of 0.01 mole per liter was treated by adding sulfuric acid sufficient to give the final solution a sulfuric acid content of 14% by weight. This solution was then extracted with xylene. The benzoic acid concentration in the xylene phase was 35 times the benzoic acid concentration in the aqueous phase. When both sulfuric acid and ammonium sulfate were added to the same benzoic acid solution in amounts sufficient to give the solution a content of sulfuric acid of 14% by weight and a content of ammonium sulfate of 18% by weight, and the resulting solution was extracted with xylene at 70° F., the benzoic acid concentration in the xylene phase was more than 100 times the benzoic acid concentration in the aqueous phase. In this extraction the sulfuric acid and ammonium sulfate were present for the most part as ammonium bisulfate.

Dilute aqueous solutions containing a mixture of benzoic acid and toluic acid as the solute are effectively treated by the process of the invention for the recovery of both acids.

Dilute aqueous solutions containing benzoic acid, toluic acid and a phthalic acid as the solute may be effectively treated for the removal of benzoic and toluic acids pursuant to the invention. The phthalic acid remains in the aqueous phase and this fact is of considerable advantage, especially when the filtrate being treated is the product of an oxidation process such as that described in connection with the drawing or described in Patent No. 2,610,980.

Either sulfuric acid, ammonium sulfate or ammonium bisulfate may be added to the idlute aqueous benzoic acid prior to extraction with xylene. These materials are particularly effective in increasing the proportion of benzoic acid going into the xylene phase during the extraction. In order to achieve good benzoic acid recovery, these materials should be added in amounts sufficient to constitute from about 5% to about 35% of the aqueous solution at the time of its contact with xylene.

The extraction may be carried out at temperatures below about 250° F. At higher temperatures the distribution of benzoic acid in the xylene and aqueous phases is less favorable. When the aqueous benzoic acid subjected to extraction pursuant to the process of the invention contains not only benzoic acid, but small amounts from 0.1% to .5% by weight of a phthalic acid, especially isophthalic acid or terephthalic acid, the extraction should be conducted at a moderately elevated temperature, desirably above 150° F., and preferably in the range from 175° F. to 225° F., to prevent precipitation of the phthalic acid during the extraction with attendant difficulties.

One or more stages of xylene extraction may be employed and in each stage from 0.01 to about 0.5 volume of xylene per volume of aqueous benzoic acid may be used. Ordinarily, good results can be obtained in a single stage using from about 0.1 to 0.3 volume of xylene per volume of aqueous benzoic acid.

I claim:

1. A process for treating an aqueous solution containing about 0.1 to 3% by weight of benzoic acid, about 0.1 to 0.5% toluic acid, 0.01 to 0.5% isophthalic acid and about 10 to 30% ammonium bisulfate to separate benzoic and toluic acid therefrom, which comprises extracting said solution at least once with 0.01 to 0.5 volume of xylene per volume of solution at a temperature in the range from about 150 to 250° F., separating a xylene phase and an aqueous phase and recovering benzoic acid and toluic acid from the xylene phase.

2. A process for treating aqueous solutions containing small amounts of benzoic acid, toluic acid and isophthalic acids as the solute, the concentration of each acid being in the range from 0.1% to 2.5% by weight based on water, which comprises dissolving in the solution from about 15 to 30% by weight based on water of at least one material selected from the group consisting of sulfuric acid, ammonium sulfate and ammonium bisulfate, contacting one volume of the resulting solution with about 0.01 to 0.5 volume of a xylene at a temperature in the range from about 150 to 250° F. and separating a xylene phase comprising benzoic acid and toluic acid.

3. In a process for producing phthalic acids by oxidizing a xylene selected from the group consisting of meta-xylene and para-xylene by heating it with water, ammonium sulfate and a water-soluble sulfide in an oxidation zone to produce a reaction product comprising phthalic acid amides and ammonium phthalate, hydrolyzing the reaction product with aqueous sulfuric acid and filtering the hydrolysis product to separate a filter cake comprising phthalic acids and an aqueous filtrate comprising amoninum sulfate, sulfuric acid, benzoic acid, toluic acid and phthalic acid, the improvement which comprises extracting benzoic acid and toluic acid from the filtrate by contacting it with 0.1 to 0.5 volume of xylene at 150 to 250° F. and separating a xylene phase comprising benzoic acid and toluic acid and an aqueous phase comprising dissolved ammonium sulfate.

4. A process for recovering benzoic acid from dilute aqueous solutions thereof which comprises dissolving a quantity of at least one material of the group consisting of sulfuric acid, ammonium sulfate and ammonium bisulfate in said solution to give the resulting solution a content of said material in the range from 10 to 35% by weight, extracting the resulting solution with about 0.1 to 0.3 volume of xylene per volume of solution at a temperature in the range from about 150 to 250° F., separating a xylene phase comprising benzoic acid and an aqueous phase and recovering benzoic acid from the xylene phase.

5. The method as defined in claim 3, wherein at least a part of the aqueous phase comprising dissolved ammonium sulfate is returned to the oxidation zone together with further quantities of xylene.

References Cited in the file of this patent

UNITED STATES PATENTS

| 1,685,634 | Jaeger | Sept. 25, 1928 |
| 1,919,023 | Jaeger | July 18, 1933 |
| 2,587,666 | Toland | Mar. 4, 1952 |
| 2,610,980 | Naylor | Sept. 16, 1952 |

FOREIGN PATENTS

| 329,375 | Great Britain | May 19, 1930 |